(12) United States Patent
Tyebkhan et al.

(10) Patent No.: US 10,585,579 B2
(45) Date of Patent: Mar. 10, 2020

(54) TEACHING AND COACHING USER INTERFACE ELEMENT WITH CELEBRATORY MESSAGE

(71) Applicant: MICROSOFT TECHNOLOGY LICENSING, LLC, Redmond, WA (US)

(72) Inventors: Arwa Zoher Tyebkhan, Redmond, WA (US); Carlos G. Perez, Redmond, WA (US); Max S. Lustig, Seattle, WA (US); John Henry Miller, Seattle, WA (US); Gregory P. Young, Redmond, WA (US); Anne Catherine Feldman, Redmond, WA (US); Reema Bhagat, Bellevue, WA (US); Colton B. Marshall, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 188 days.

(21) Appl. No.: 15/581,513

(22) Filed: Apr. 28, 2017

(65) Prior Publication Data
US 2018/0188918 A1 Jul. 5, 2018

Related U.S. Application Data

(60) Provisional application No. 62/440,917, filed on Dec. 30, 2016.

(51) Int. Cl.
*G06F 3/00* (2006.01)
*G06F 3/0486* (2013.01)
(Continued)

(52) U.S. Cl.
CPC ............ *G06F 3/0486* (2013.01); *G09B 5/02* (2013.01); *G09B 19/0053* (2013.01); *G06Q 10/103* (2013.01); *G06Q 10/1093* (2013.01)

(58) Field of Classification Search
None
See application file for complete search history.

(56) References Cited

U.S. PATENT DOCUMENTS

| 6,583,799 B1 | 6/2003 | Manolis et al. |
| 8,385,950 B1 | 2/2013 | Wagner et al. |
| (Continued) | | |

OTHER PUBLICATIONS

Daniel Siewiorek et al., Architectdure and Applications of Virtual Coaches, Jul. 13, 2012, IEEE, vol. 100, No. 8, pp. 2472-2488 (Year: 2012).*

(Continued)

*Primary Examiner* — Tam T Tran
(74) *Attorney, Agent, or Firm* — Michael Best & Friedrich LLP

(57) ABSTRACT

Providing user interaction guidance for services and associated applications may become more difficult as their variety and depth increases. Embodiments are directed to managing activation of and providing guidance on how to use a hosted service. For example, an initial configuration of a user interface (UI) of the hosted service that includes at least one element to highlight functionality may be provided for display. An initial action may be received from a user associated with the functionality, the initial action may be performed, and the UI may be updated to reflect the performed initial action. The initial action may be an activation action or upload action, for example. Additionally, a teaching UI element with a celebratory message to highlight the performed initial action and to provide additional information may be provided for display and rendered at a proximate position to a representation of the performed initial action.

18 Claims, 15 Drawing Sheets

(51) Int. Cl.
*G09B 5/02* (2006.01)
*G09B 19/00* (2006.01)
*G06Q 10/10* (2012.01)

(56) References Cited

U.S. PATENT DOCUMENTS

| | | | |
|---|---|---|---|
| 8,504,586 B2 | 8/2013 | Armstrong et al. | |
| 8,799,829 B2 | 8/2014 | Grosz et al. | |
| 9,049,547 B2 | 6/2015 | Ngo et al. | |
| 9,173,009 B2 | 10/2015 | Kalajan | |
| 9,271,137 B2 * | 2/2016 | Chan | H04W 8/02 |
| 9,489,510 B1 * | 11/2016 | Scott | G06F 21/45 |
| 2008/0059571 A1 * | 3/2008 | Khoo | G06Q 30/02 709/203 |
| 2009/0103124 A1 * | 4/2009 | Kimura | G06F 3/1204 358/1.15 |
| 2009/0104977 A1 * | 4/2009 | Zielinski | G07F 17/32 463/25 |
| 2009/0164606 A1 | 6/2009 | Epifania et al. | |
| 2012/0110515 A1 * | 5/2012 | Abramoff | G06F 17/30994 715/854 |
| 2013/0097500 A1 | 4/2013 | Rajagopal | |
| 2013/0159220 A1 | 6/2013 | Winn et al. | |
| 2013/0159408 A1 | 6/2013 | Winn et al. | |
| 2015/0253946 A1 * | 9/2015 | Chandrasekaran | H04L 67/06 715/748 |
| 2015/0277688 A1 | 10/2015 | Behar et al. | |
| 2017/0094057 A1 * | 3/2017 | Naiga | H04M 3/493 |

OTHER PUBLICATIONS

Gongzhu Hu et al., Collaborative File Editor Using Repository in a Box, Jul. 1, 2007, IEEE Computer Society, pp. 1-6 (Year: 2007).*
"International Search Report and Written Opinion Issued in PCT Application No. PCT/US2017/068387", dated Mar. 8, 2018, 12 Pages.
Lehmann, Hagen, "Warning!!! Do not use Cloud Station anymore", https://forum.synology.com/enu/viewtopic.php?t=83860, Published on: Apr. 2, 2014, 12 pages.
Soferman, Nadav, "Introducing a complete and modern UI widget for cloud based image uploading", http://cloudinary.com/blog/introducing_a_complete_and_modern_ui_widget_for_cloud_based_image_uploading, Published on: Nov. 27, 2014, 13 pages.
"Upload Files", https://developers.google.com/drive/v3/web/manage-uploads, Published on: Aug. 26, 2016, 15 pages.
Callahan, Jane, "12 Advanced Dropbox Features That You Should Start Using", https://zapier.com/blog/dropbox-hidden-features/, Published on: Jun. 23, 2015, 17 pages.
"Upload files and folders to Google Drive", https://support.google.com/drive/answer/2424368?co=GENIE.Platform%3DDesktop&hl=en, Published on: Dec. 9, 2016, 2 pages.

* cited by examiner

TEACHING AND COACHING USER INTERFACE ELEMENT WITH CELEBRATORY MESSAGE

CROSS-REFERENCE TO RELATED APPLICATION

This application claims the benefit under 35 U.S.C. § 119(e) of U.S. patent application Ser. No. 62/440,917 filed on Dec. 30, 2016. The U.S. Patent Application is herein incorporated by reference in its entirety.

BACKGROUND

Online services and applications increasingly provide useful tools for a variety of customers ranging from large enterprise entities to small businesses and individuals. With the increasing variety and depth of the services, providing user interaction guidance for interactions with the services and their associated applications may be difficult. Enterprise entities typically have dedicated resources to train users, however small businesses or individuals may lack the resources and knowledge to provide training that is necessary to effectively consume functionality provided by modern services and their associated applications.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to provision of a teaching and coaching user interface (UI) element with a celebratory message related to an, action perfumed by a hosted service. A teaching module of the hosted service may be configured to provide or display an initial configuration of a user interface for the hosted service that includes at least one element to highlight a functionality, receive an initial action from a user associated with the functionality, and perform the initial action. The teaching module may then be configured to update the user interface to reflect the performed initial action and provide for display a teaching UI element with a celebratory message to highlight the performed initial action and to provide additional information, where the teaching UI element may be rendered at a proximate position to a representation of the performed initial action.

These and other features and advantages will be apparent from a reading of the following detailed description and a review of the associated drawings. It is to be understood that both the foregoing general description and the following detailed description are explanatory and do not restrict aspects as claimed.

BRIEF DESCRIPTION OF THE DRAWINGS

FIGS. 4A and 414 include display diagrams illustrating examples of a UI of a productivity service that renders a teaching UI element with a celebratory message related to an activation action performed by the productivity service;

DETAILED DESCRIPTION

Figure 1A:
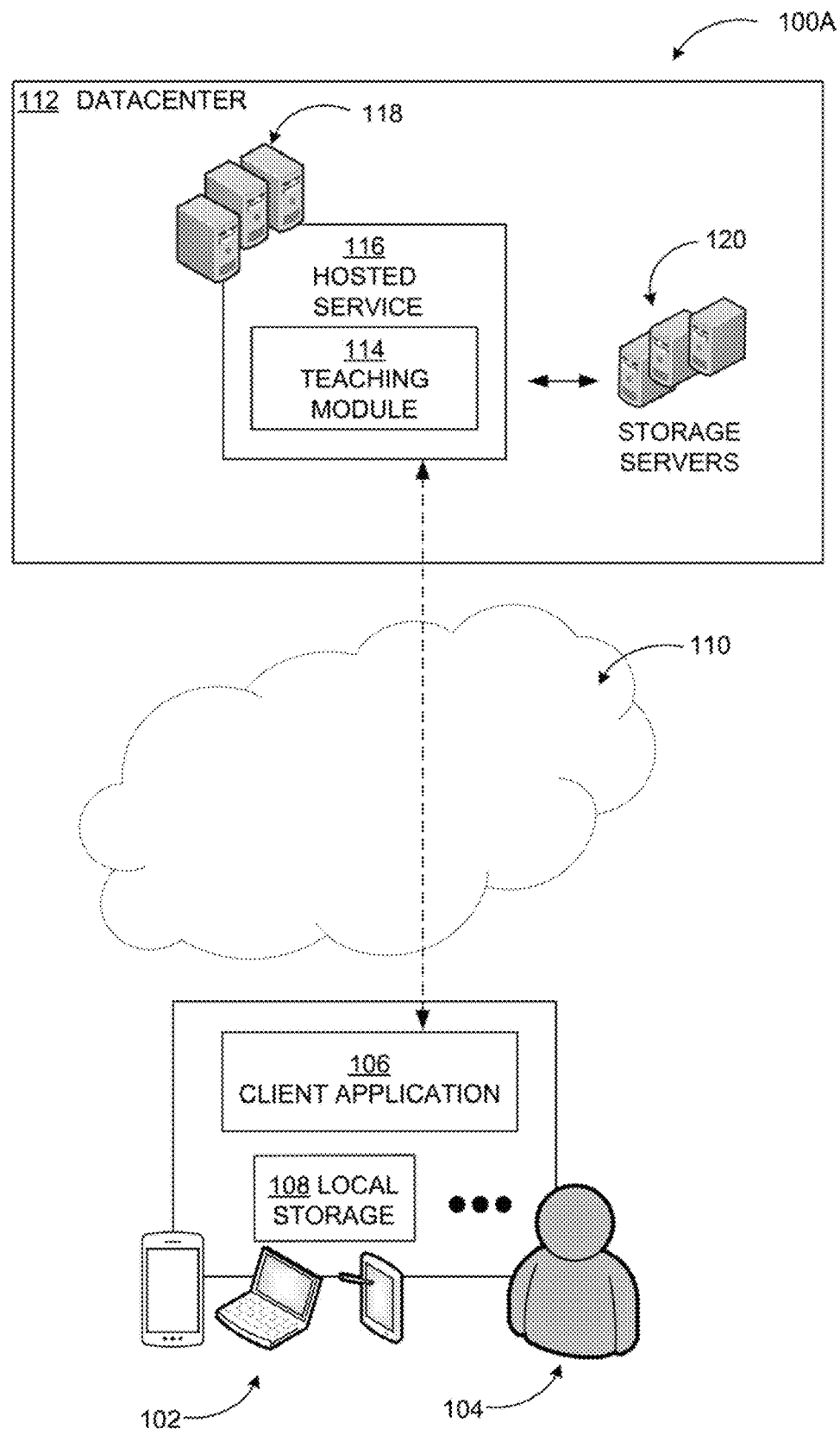
FIGS. 1A and 1B include display diagrams illustrating an example network environment where provision of a teaching user interface (UI) element with a celebratory message may be implemented.

As briefly described above, embodiments are directed to providing a teaching user interface (UI) element with a celebratory message related to an action performed by a hosted service. A teaching module of the hosted service may be configured to provide for display an initial configuration of a UI for the hosted service that includes at least one element to highlight a functionality, receive an initial action from a user associated with the functionality, and perform the initial action. The teaching module may then be configured to update the UI to reflect the performed initial action and provide for display a teaching UI element with a celebratory message to highlight the performed initial action and to provide additional information, where the teaching UI element may be rendered at a proximate position to a representation of the performed initial action.

In other examples, a coaching UI element may be provided adjacent to a control element or other item on the hosted service UI upon detecting, user interest (e.g., clicking on or hovering, over the control element or other item). Upon further interest (user staying on the coaching element or clicking on it), an explanatory message may be displayed and a number of tasks in a particular task flow associated with the control element or other item such as creation of a new document may be performed for the user. The hosted service may be a cloud storage service, a productivity service, a collaboration service, a communication service, and/or a calendaring service, among other similar services. In a cloud storage service, for example, the functionality may be an upload functionality and the initial action may be an upload action. In a productivity service, for example, the functionality may be an activation functionality and the initial action may be an activation action.

In the following detailed description, references are made to the accompanying drawings that form a part hereof, and in which are shown by way of illustrations, specific embodiments, or examples. These aspects may be combined, other aspects may be utilized, and structural changes may be made without departing from the spirit or scope of the present disclosure. The following detailed description is therefore not to be taken in a limiting sense, and the scope of the present disclosure is defined by the appended claims and their equivalents.

While the embodiments will be described in the general context of program modules that execute in conjunction with an application program that runs on an operating system on a computing device, those skilled in the art will recognize that aspects may, also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multi-processor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in, both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a computer-readable memory device. The computer-readable memory device includes a hardware device that includes a hard disk drive, a solid state drive, a compact disk, and a memory chip, among others. The computer-readable storage medium can for example be implemented, via one or more of a volatile computer memory, a non-volatile memory, a hard drive, and a flash drive.

Throughout this specification, the term "platform" may be a combination of software and hardware components to provide a teaching user interface (UI) element with a celebratory message related to an, action performed by a hosted service. Examples of platforms include, but are not limited to, a hosted service executed over a plurality of servers, an application executed on a single computing device, and comparable systems. The term "server" generally refers to a computing device executing one or more software programs typically in a networked environment. More detail on these technologies and example embodiments may be found in the following description.

Figure 1B:
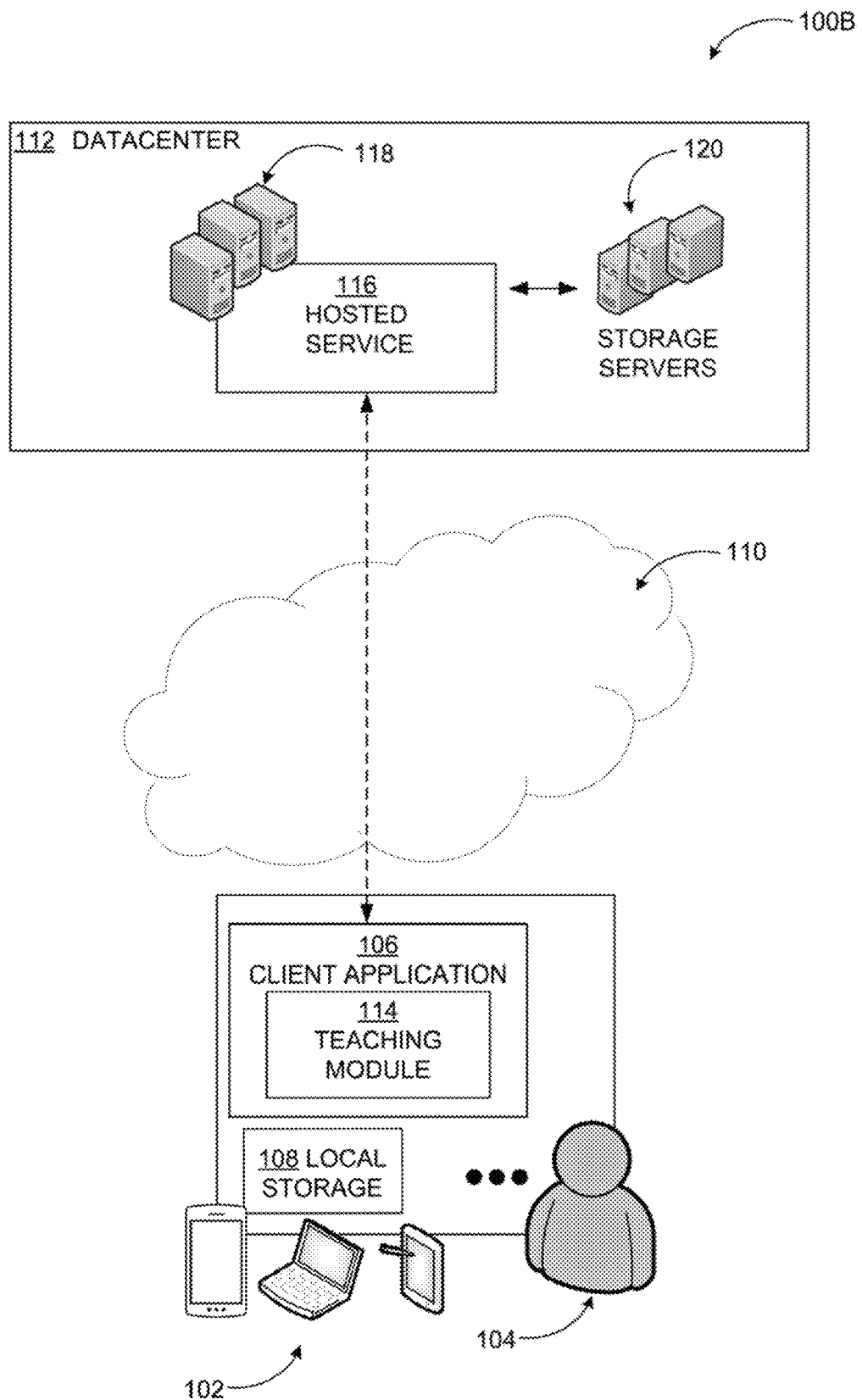

FIGS. 1A through 1B include display diagrams illustrating an example network environment where provision of a teaching UI element with a celebratory message may be implemented.

As illustrated in diagrams 100A and 100B, an example system may include a datacenter 112 executing a hosted service 116 on at least one processing server 118. The hosted service 116 may include a productivity service, a collaboration service, a cloud storage service, a communication service, a scheduling service, an online conferencing service, and comparable ones. In some embodiments, the hosted service 116 may be configured to interoperate with a client application 106 through one or more client devices 102 over one or more networks, such as network 110. For example, the client application 106 may be a word processing application, a presentation application, a notebook application, a spreadsheet application, a communication application, or a calendaring application in conjunction with a productivity service or a collaboration service, or the client application 106 may be a synchronization application in conjunction with a cloud storage service. The client devices 102 may include a desktop computer, a laptop computer, a tablet computer, a vehicle-mount computer, a smart phone, or a wearable computing device, among other similar devices. In some examples, the hosted service 116 may allow users to access its services through the client application 106 executed on the client devices 102. In other examples, the hosted service 116 may be provided to a tenant (e.g., a business, an organization, or similar entities), which may configure and manage the services for their users.

In one embodiment, as illustrated in diagram 100A, the processing server 118 may be operable to execute a teaching module 114, where the teaching module 114 may be integrated with the hosted service 116. In another embodiment, as illustrated in diagram 100B, the client application 106 may be operable to execute the teaching module 114, where the teaching module 114 may be integrated with the client application 106. As described herein, the hosted service 116 and/or the teaching module 114 may be implemented as software, hardware, or combinations thereof.

The teaching module 114 may manage activation of services for users as well as provide, assistance for new users. The teaching module 114 may be configured to provide for display an initial configuration of a for the hosted service 116 that includes at least one element to highlight a functionality of the hosted service 116. The element may include a graphical icon and a default message, for example. In some embodiments, the default message may be based on a predicted initial action of the user 104, where the predicted initial action is obtained by processing a behavioral context of one or more previous actions of the user 104, a current status of the user 104, and/or a presence information associated with the user 104 with a machine learning scheme. Additionally or alternatively, if user confusion is detected from an analysis of a past action of the user 104, an instruction may be included within the default message to resolve the user confusion. Next, the hosted service 116 may receive an initial action from the user 104 associated with the functionality, and perform the initial action. The teaching module 114 may be configured to update the UI to reflect the performed initial action, and provide for display a teaching UI element with a celebratory message to highlight the performed initial action and to provide additional information, such as to perform a subsequent action or retrieve an incentive award or credit. The celebratory message may include a textual, a graphic, an animated, and/or an interactive UI based message. In some examples, a modified version of the element may be provided liar display in conjunction with the teaching UI element to further highlight that the initial action has been performed.

In one example embodiment, the hosted service 116 may be a productivity service configured to, among other things, provide services that enable the user 104 to create, edit, and share content, such as word processing, spreadsheets, presentations, calendaring, etc. The productivity service may include the teaching module 114, where the teaching module may manage activation of the services and provide assistance for the user 104. For example, the teaching module 114 may be configured to provide for display an initial configuration of a productivity service UI that includes an element to highlight an activation functionality (e.g., how the user can activate or begin to use the productivity service and its, associated applications). An activation action may be received through the productivity service and the activation action may be performed. The teaching module 114 may be configured to update the user interface to reflect the performed activation action and provide for display a teaching UI element with a celebratory message to highlight the performed activation action and to provide additional information.

In another example embodiment, the hosted service 116 may be a storage service configured to provide services to store content for the user 104 by synchronizing selected local storages (e.g. local storage 108) with cloud storage managed by storage servers 120 through the synchronization application (e.g., client application 106), for example. The storage service may include the teaching module 114 that may manage activation of services and provide assistance to the user 104. For example, the teaching module 114 may be configured to provide for display an initial configuration of a cloud storage service UI that includes an element to highlight an upload functionality (e.g., how to upload content such that it is stored remotely within the storage servers 120). An upload action may be received through the cloud storage service UI, and the upload action may be performed. The teaching module 114 may be configured to update the user interface to reflect the performed upload action and provide for display a teaching UI element with a celebratory message to highlight the performed upload action and to provide additional information.

As previously discussed, the increasing variety and depth of hosted services, has made providing user interaction guidance for interactions with services and applications difficult. Provision of a teaching UI element with a celebratory message, as described in the embodiments herein, may aid in improving performance of hosted services, reducing the amount of processing and network bandwidth usage, and improving user interaction and user efficiency by guiding and even incentivizing a user through interactions associated with the hosted services to promote completion.

Embodiments, as described herein, address a need that arises from a very large scale of operations created by software-based services that cannot be managed by humans. The actions/operations described herein are not a mere use of a computer, but address results of a system that is a direct consequence of software used as a service offered in conjunction with a large numbers of devices and users using hosted services.

Figure 2A:
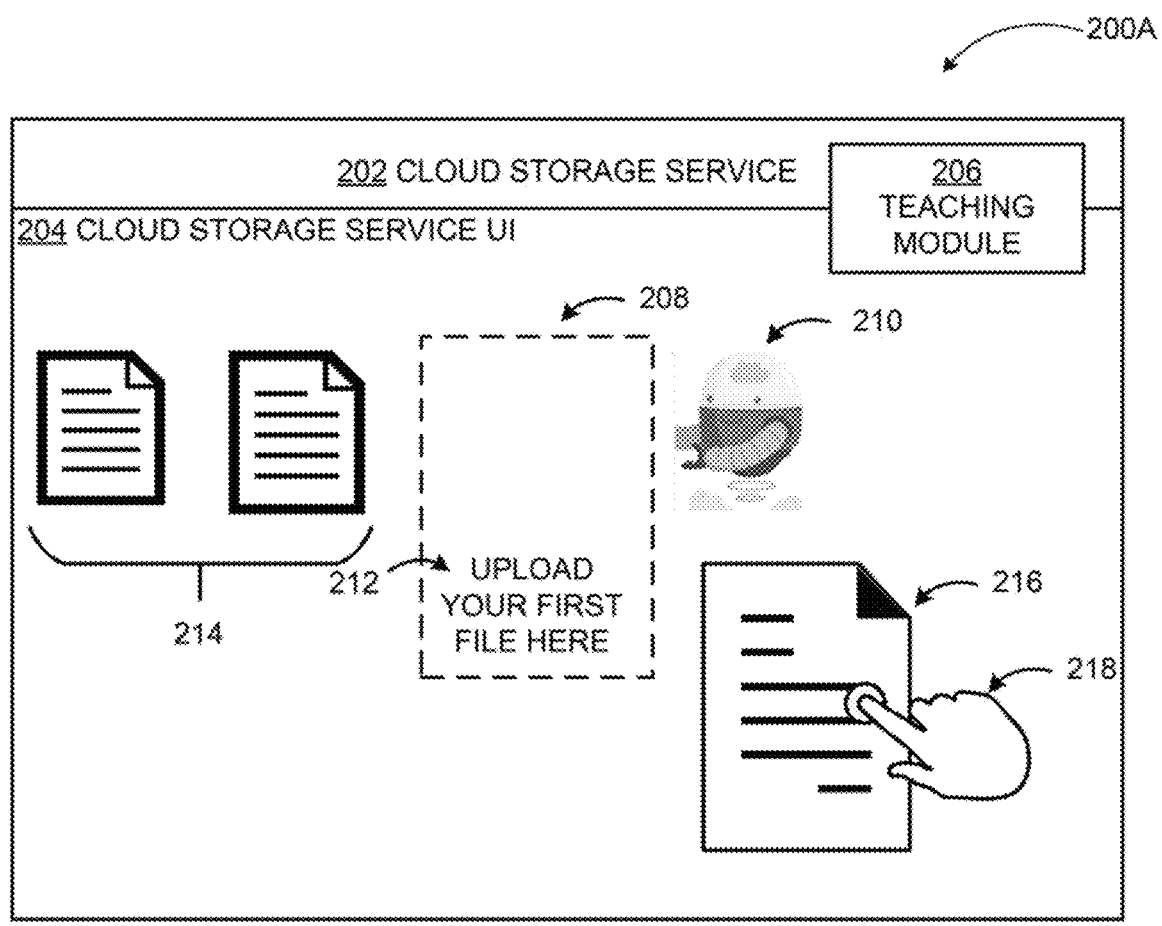
FIGS. 2A and 2B include display diagrams illustrating an example of a UI of a cloud storage service that renders a teaching UI element with a celebratory message related to an upload action performed by the cloud storage service.
Figure 2B:
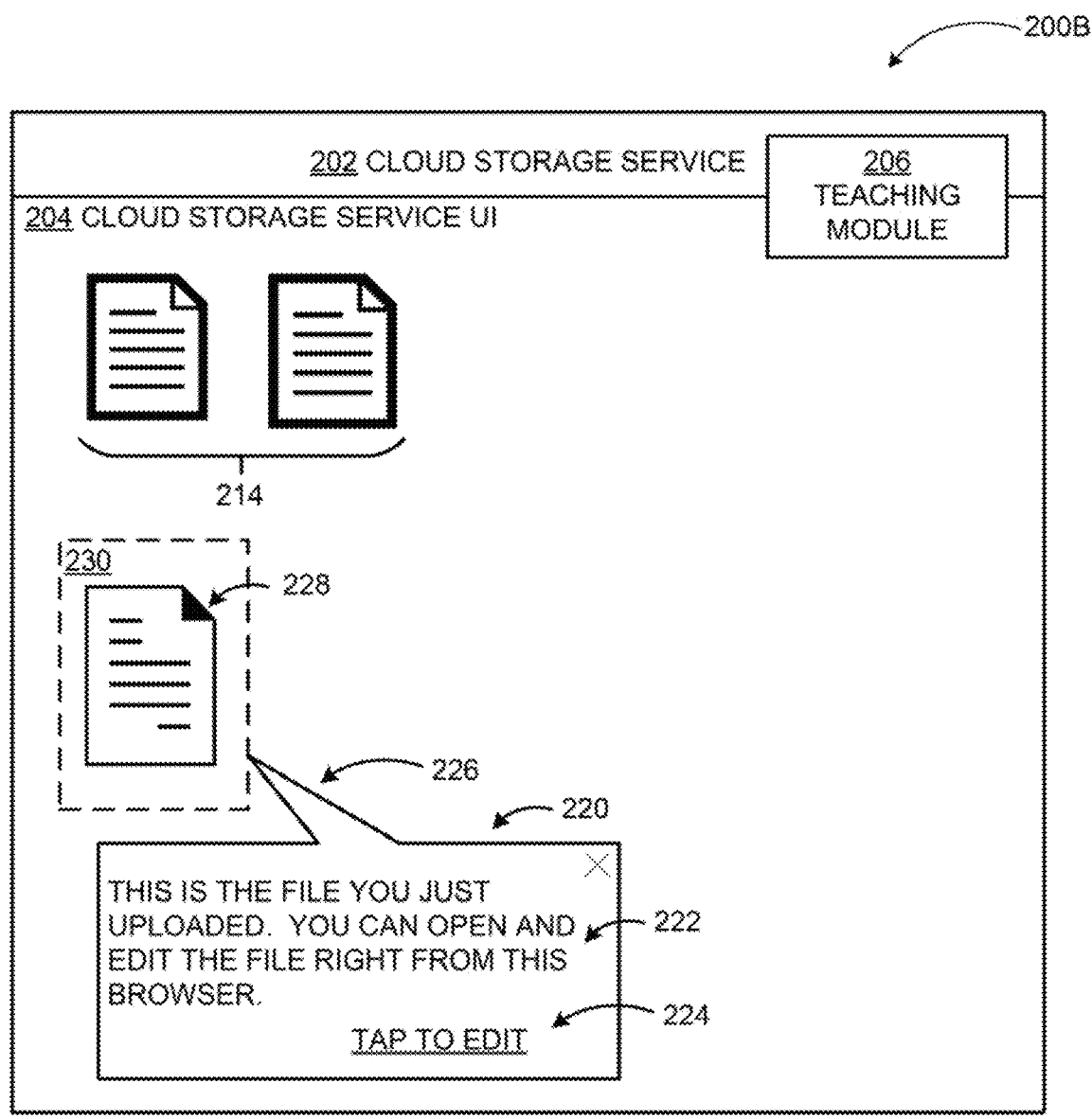

FIGS. 2A and 2B include display diagrams illustrating an example of a UI of a cloud storage service that renders a teaching UI element with a celebratory message related to an upload action performed by the cloud storage device.

As shown in diagrams 200A and 200B, a cloud storage service 202 may be configured to provide services to store content remotely for a user. The cloud storage 202 may include a teaching module 206 that may manage activation of services and provide assistance to the user. In an example scenario, the teaching module 206 may be configured provide for display an initial configuration of a cloud storage service UI 204. As shown in a diagram 200A, the initial configuration of the cloud storage UI 204 may include an element 208 associated with a functionality of the cloud storage service 202, such as an upload functionality. The element 208 a include an icon 210 and a default message to guide (and/or prompt) a user to interact with the cloud storage service UI 204. The default message 212 a "Upload your first file here."

The default message 212 may be generated based on a predicted initial action of the user. The initial action may be predicted by processing a behavioral context associated with previous actions of the user. For example, if the user may be identified as having uploaded a number of content within a time period (compared to a number other actions that are less than the number of content upload actions during the time period), then the initial action may be predicted as an upload action to upload content. Furthermore, a current status of the user as available, not available, or offline and/or presence information associated with the user, such as location near or at a computing device rendering the cloud storage service UI 204, may be used to predict the initial action of the user. For example, a location nears or at the computing device that renders the cloud storage service UI 204 may be used to predict an into interact with the cloud storage service UI 204. A frequent history of content upload actions may be used to predict the initial action as an upload action. Furthermore an available status of the user may indicate a capability to interact with the cloud storage service 202 to upload the content. Information associated with the behavioral context of the user may be received from a variety of sources and processed by a machine learning scheme to predict the initial action of the user. Upon predicting the initial action, the default message 212 may be generated based on the predicted initial action. For example, the default message 212 may be generated to include a suggestion to upload content at a specific position in the cloud storage service UI 204.

Additionally, if user confusion is detected from an analysis of a past action of the user, additional instructions may be included within the default message 212 to resolve the user confusion. For example, if the user had difficulty uploading a document in the past, the instruction may include one or more steps illustrating how to upload the document, where the steps may illustrate the instruction with graphics to help guide the user. For example, the default message 212 may more specifically state, "To upload your first file, drag and drop the document here."

An upload action 21 to upload content 216 may be received from the user through the cloud storage service UI 204, and the cloud storage service 202 may be configured to upload the content 216. As shown in a diagram 200B, the teaching module 114 may then be configured, to update the cloud storage service UI 204 to reflect the performed upload action and provide for display a teaching UI element 220 with a celebratory message 222 to highlight the performed upload action and to provide additional information. The teaching UI element 220 may be rendered at a proximate position to a representation 228 of the performed upload action. The representation 228 may be a thumbnail or icon of the content 216 uploaded by the performed upload action.

A position 230 of the representation 228 may be determined based on an available space between representations of previously stored content 214 and an outer perimeter or an edge of the cloud storage service UI 204. For example, if an available space between the representations of previously stored content 214 and a vertical outer perimeter of the cloud storage service UI 204, such as a right edge, is confirmed as sufficient to insert the representation 228, then a location associated with the available space may be selected for the position 230 of the representation 228. Alternatively, an available space in a vertical proximity to the representations of previously stored content 214 may be selected for the position 230 of the representation 228 if the available space is confirmed as sufficient to insert the representation 228. When the default message 212 is provided, the position 230 for the representation 228 may be provided as a suggestion for the user to upload the content 216 by placing the representation 228 in that position 230 within the cloud storage service UI 204. Alternatively, the upload action 218 to place the representation 228 in any position within the cloud storage service UI 204 may be detected as an intent to upload the content 216. In such a scenario, the content 216 may be saved and the representation 228 may be placed within an available space near or at the location of the upload action 218.

The teaching UI element 220 may be rendered at a proximate position to the representation 228 to emphasize the performed upload action. Furthermore, a component 226 of the teaching UI element 220 may include a directional element to distinguish the representation 228 to help facilitate the user's understanding. For example, the component 226 may emphasize the completion of the upload action and to remind the user about the content that was uploaded.

The celebratory message 222 may acknowledge and/or emphasize the completion of the upload action. For example, the celebratory message may state that "This is the file you just uploaded." The teaching module 206 may also be configured to predict a subsequent action of the user based on the uploaded content and a contextual information associated with the user. The uploaded content and/or the contextual information associated with the user, such as past interactions with the cloud storage service UI 204, may be processed by a machine learning scheme to predict the subsequent action. For example, past interactions in which the user has edited an uploaded content may be analyzed to predict, an edit action as a subsequent action by the user. Upon the analysis, the teaching module 206 may provide a suggestion for rendering within the teaching UI element 310 in conjunction with the celebratory message 222. The suggestion may prompt the user to perform the subsequent action, and include an actionable link 224 to the content. For example, the suggestion may prompt the user to open or edit the content that was just uploaded using the actionable link 224 to the content. Examples of the subsequent action may include a view action, an edit action, and/or a related upload action associated with the uploaded content.

Figure 3:
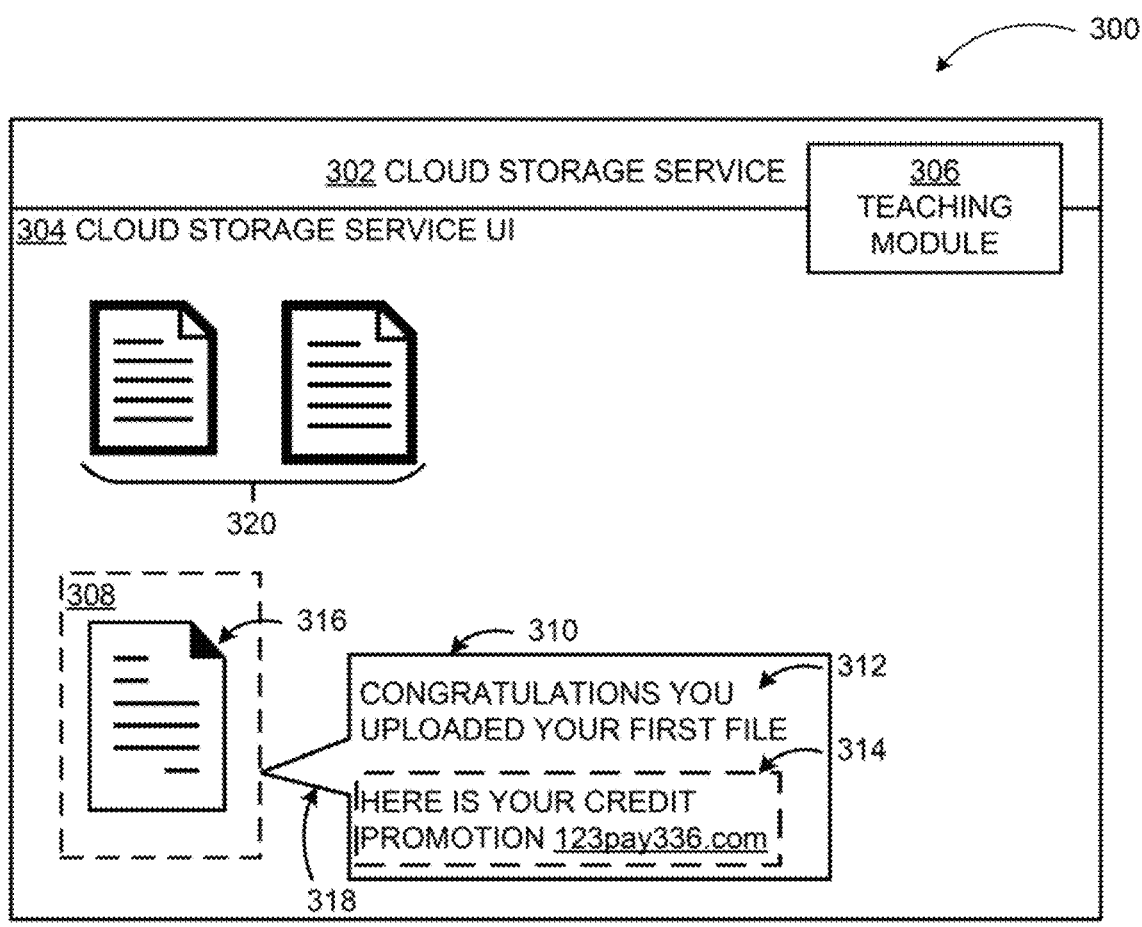
FIG. 3 includes a display diagram illustrating another example of a UI of a cloud storage service that renders a teaching UI element with a celebratory message and an incentive component.

FIG. 3 includes a display diagram illustrating another example of a UI of a cloud storage service that renders a teaching UI element with a celebratory message and an incentive component.

As shown in a diagram 300, a cloud storage service 302 may upload content in response to receipt of an upload action from a user to upload the content through a cloud storage service UI 304. A representation 316 of the uploaded content, such as an icon and/or a thumbnail, may be provided for rendering on the cloud storage service UI 304. A teaching module 306 of the cloud storage service 302 may be configured to determine a position 308 for the representation 316 of the uploaded content, within the cloud storage service UI 304, and render the representation 316 at the position 308. The position 308 of the representation 228 may be determined based on an available space between representations of previously stored content 320 and, an outer perimeter or an edge of the cloud storage service UI 304, for example.

The teaching module 306 may then be configured to provide a teaching UI element 310 with a celebratory message 312. The teaching UI element 310 may be provided for rendering within a proximate position to the position 308 of the representation 316. The proximity of the teaching UI element 310 to the representation 316 may emphasize a completed initial action (that is, the completed upload of the content) by the user. Furthermore, a component 318 of the teaching UI element may include a directional element to distinguish the representation 316 that facilitates the user's understanding by emphasizing a completion of the upload action and reminding the user about the uploaded content.

The celebratory message 312 may be an encouraging message that acknowledges and emphasizes the completion of the upload action. The celebratory message may also include an incentive component 314. The incentive component 314 may include an award for the completion of the upload action. An example of an award may include an invitation to participate in a promotion related to the uploaded content.

The teaching module 306 may also predict a subsequent action of the user based on the uploaded content and a contextual information associated with the user. The uploaded content and or the contextual information associated with the user, such as past interactions with the cloud storage service UI 304, may be processed by a machine learning scheme to predict the subsequent action. In some embodiments, a suggestion to perform the subsequent action may be provided, along with an additional incentive component to complete the subsequent action, within the teaching UI element 310.

Figure 4A:
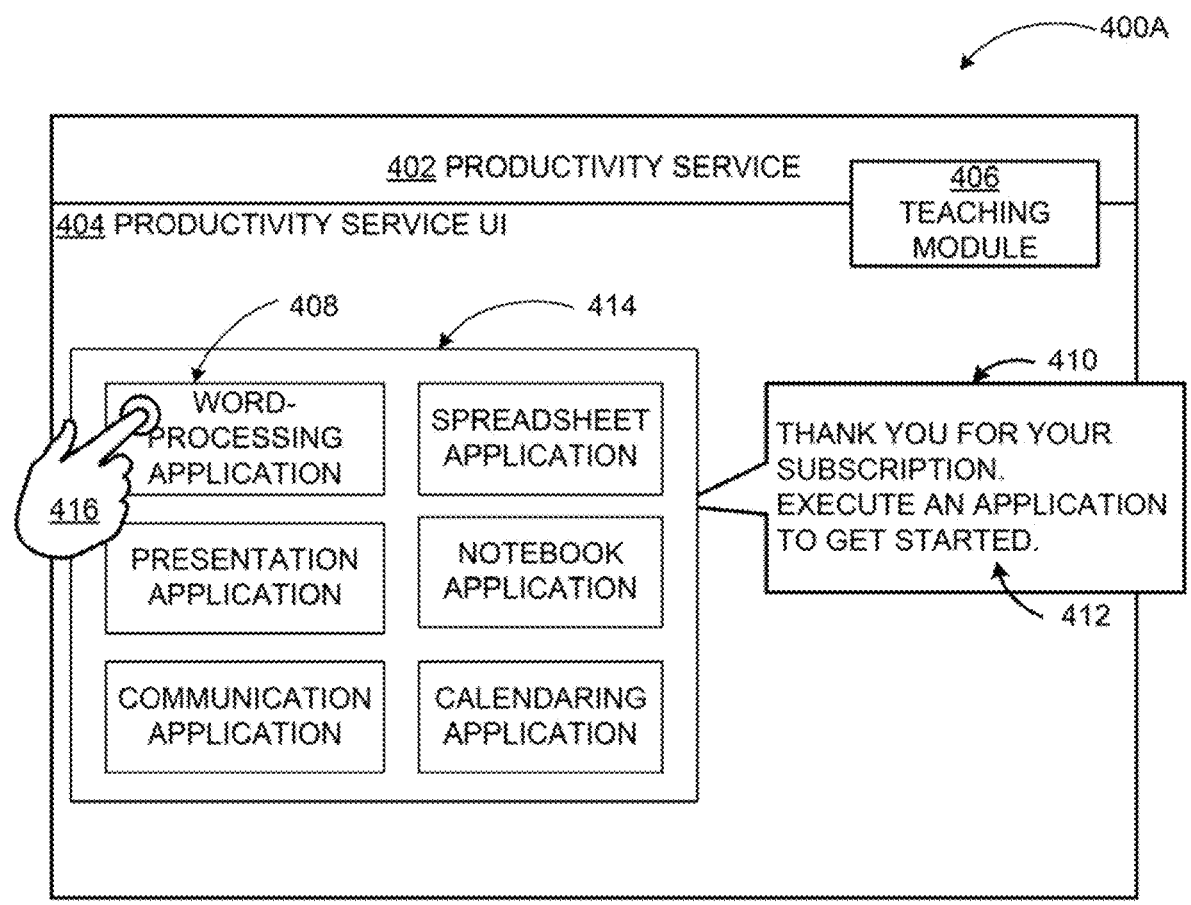
Figure 4B:
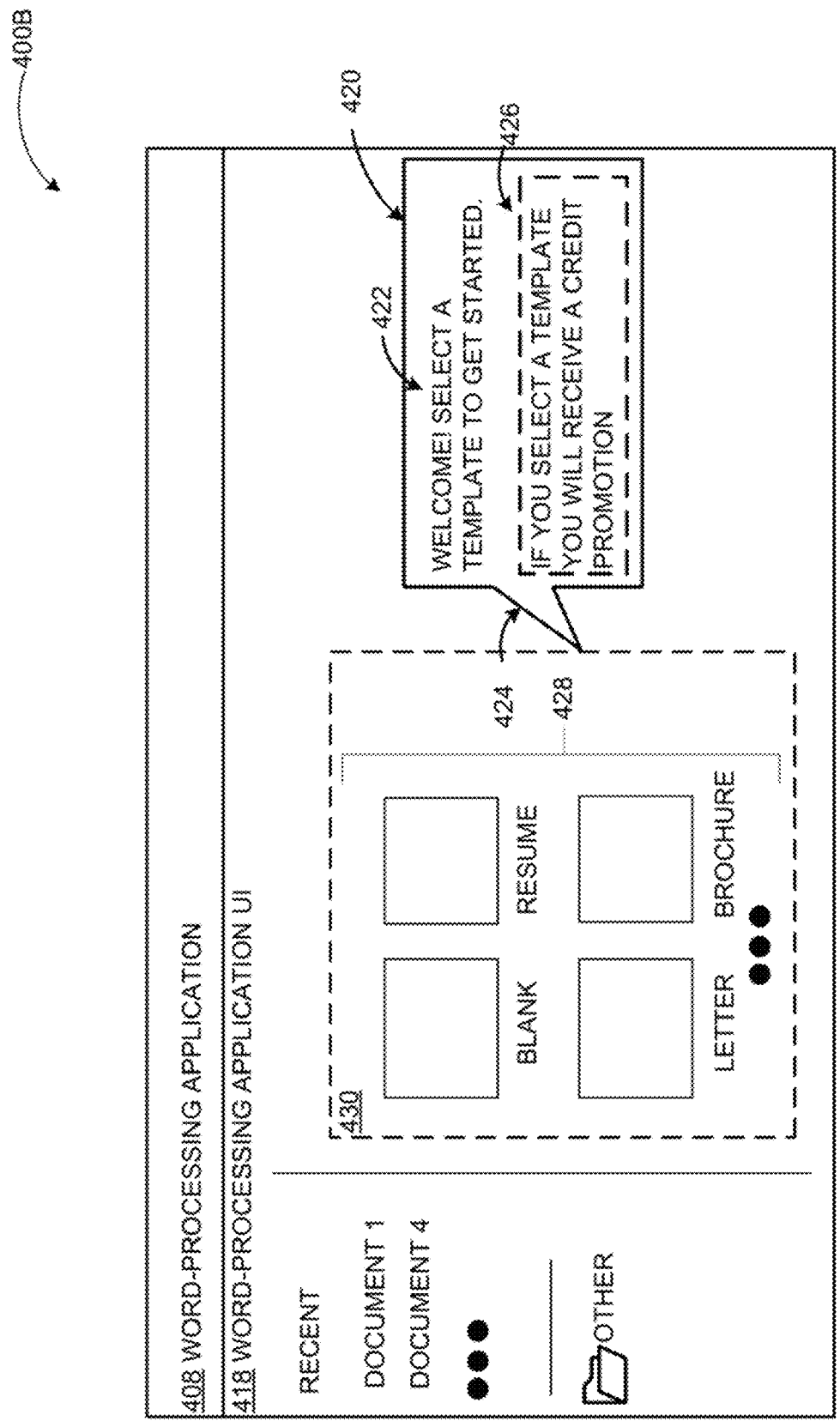

FIGS. 4A and 4B include display diagrams illustrating examples of a UI of a productivity service that renders a teaching UI element with a celebratory message related to an activation action performed by the productivity service.

As shown in diagrams 400A and 400B, a productivity service 402 may be configured to, among other things, provide service that enable a user to create, edit, and share content through a productivity service UI 404. The productivity service 402 may include a teaching module 406, where the teaching module 406 may manage activation of the services and provide assistance for the user. In an example scenario, the us may sign for the productivity service 402. As shown in the diagram 400A, activate the user's account with the productivity service 402, the teaching module 406 may be configured to provide for display an initial configuration of the productivity service UI 404 that includes an element 410 to highlight an activation functionality. The element 410 may include a default message 412 that includes instructions to "Execute an application to get started," for example. The productivity service UI 404 may provide an actionable link to each of applications 414 associated with the productivity service 402, including is word processing application 408, a spreadsheet application, a presentation application, a notebook application, a communication application, and/or calendaring application.

In some embodiments, the default message 412 may be based on a predicted initial action, wherein the predicted initial action is obtained by processing a behavioral context or more previous actions of the user, a current status of the user, and/or a presence information associated with the with a machine learning scheme. For example, the presence information may indicate a user is currently at work and her position at work is an accountant. Thus, a predicted initial action may be for the user to execute a spreadsheet application, as it is a type of application provided by the productivity service 402 that is commonly used bye accountants. Based on this information, the default message 412 may be tailored to the user, such as "Would you like to execute the spreadsheet application to get started?"

An activation action 416 may be received from the user through the productivity service UI 404, and the activation action 416 may then be performed. For example, the activation action 416 may be a selection to execute the word-processing application 408, which may be performed by executing the word-processing application 408.

As shown in diagram 400B, the teaching module 406 may then be configured to update, the productivity service UI 404 to the word-processing application UI 418 to reflect the performed activation action and provide for display a teaching IR element 420 with a celebratory message 422 to highlight the performed activation action and to provide additional information. The teaching UI element 420 may be rendered at a position proximate to a position 430 of a representation of the performed activation action. For example, the representation may be a home page of the executed word-processing application 408, where the home page includes a template selection element 428 to allow the user to select a template from which to create a document with. For example, the representation template selection element 428 may include templates for a blank document, a resume, a letter, a brochure, and other similar types of documents.

The celebratory message 422 may include an encouraging message, such as "Welcome!" and the additional information within the teaching UI element 420 may include an instructive message to perform a subsequent action, such as "Select a template to get started," The teaching UI element 420 may comprise a component 424 that points to the template selection element 428 on the home page to help facilitate the user's understanding of the subsequent action suggested. In some embodiments, the additional information within the teaching UI element 420 may also comprise an incentive component 426 that includes an award for the completion of the subsequent action suggested within the teaching UI element 420.

FIGS. 5A through 5D include display diagrams illustrating examples of a UI of a productivity service that renders a coaching UI element to perform a flow of tasks in the productivity service.

According to some embodiments, a coaching UI element may be displayed near (e.g., adjacent to) a control element or an item on a hosted service UI. The hosted service UI may be a cloud storage service UI, a productivity service UI, a collaboration service UI, and similar ones. The control element may be a command or similar menu item, for example. The other item may be a file or folder displayed through the hosted service UI. The coaching UI element may be displayed upon detection of user interest in the control element or the item. The user interest may be detected as the user clicking on the control element or item, or the user hovering over the control element or item. Upon detection of user selection of the coaching UI element (e.g., clicking on or hovering over), an explanation or suggestion may be displayed replacing the coaching UI element or in addition to it. The explanation or suggestion may be associated with a flow of tasks associated with the control element or displayed item. The tasks of the flow of tasks may then be performed through the hosted service upon user confirmation.

Figure 5A:
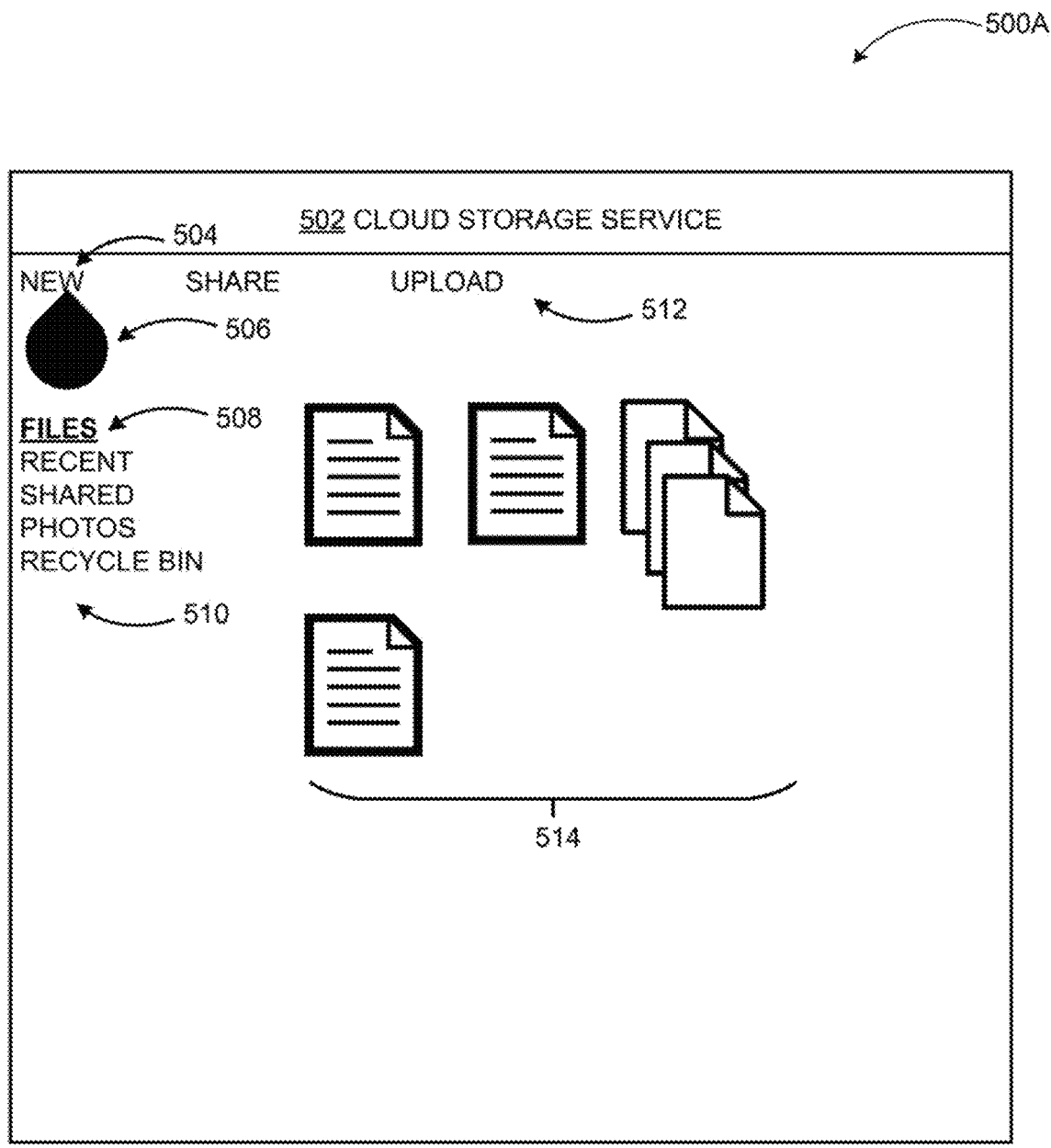
FIGS. 5A through 5D include display diagrams illustrating examples of a UI of a productivity service that renders a coaching UI element to perform a flow of tasks in conjunction with a cloud storage service, and a productivity service.
Figure 5B:
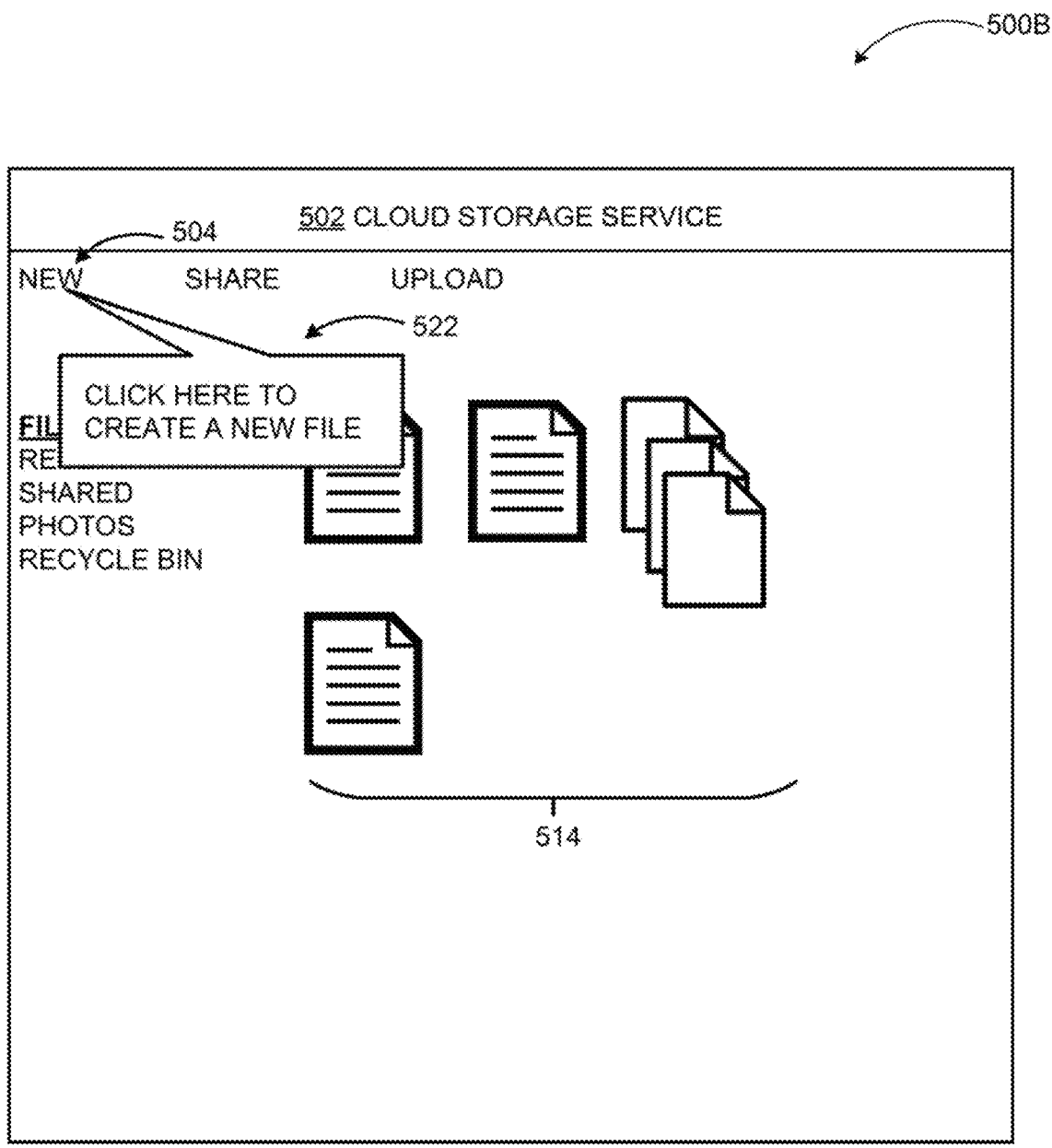
Figure 5C:
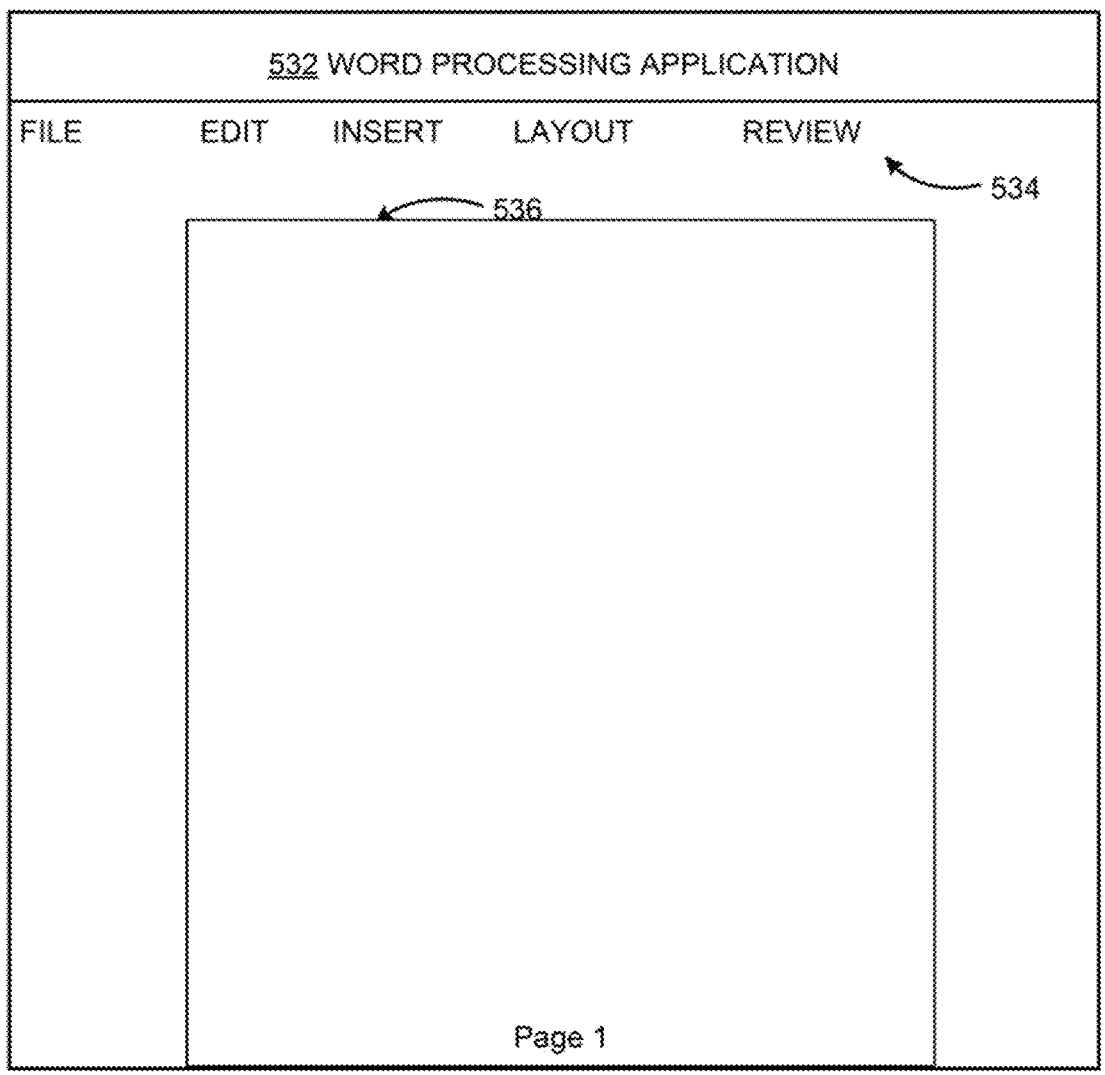
Figure 5D:
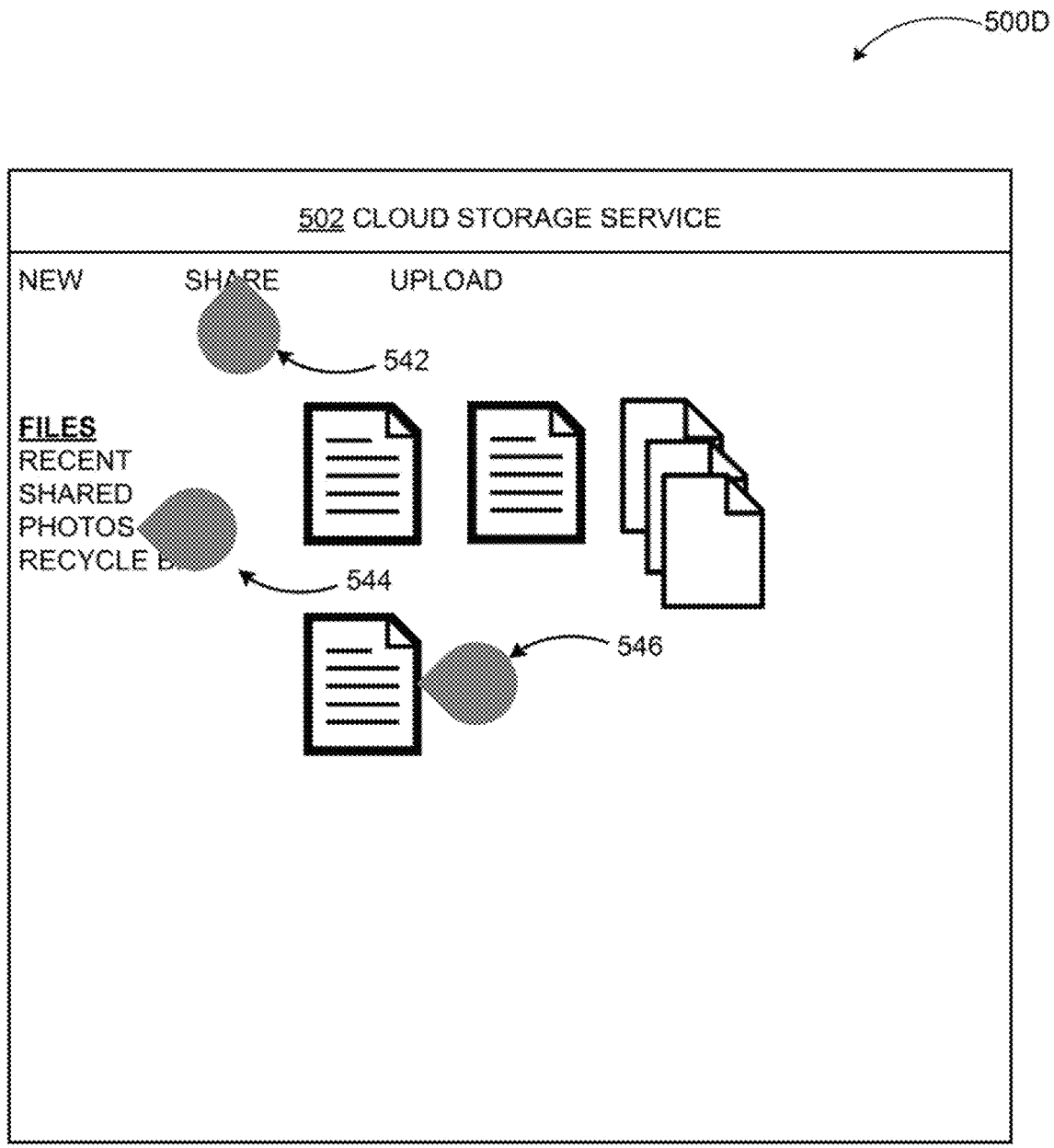

Diagrams 500A through 500C in FIGS. 5A, 5B, and 5C snow the progression. In diagram 500A, files and file groups 514 are displayed in a Files view 508 of an example cloud storage UI 502. Multiple views 510 may be available through the cloud storage UI 502. Available commands 512 may be displayed at a top of the UI. Upon detecting a user's interest (e.g., clicking on or hovering over) a command 504 (New command for creating a new file), a subtle coaching UI element 506 may be displayed.

As shown in diagram 500B an explanation or suggestion 322 associated with the control element (command 504) may be displayed upon detecting user's further interest on the coaching UI element (e.g., clicking on or hovering over). The explanation or suggestion 522 may inform the user about the available flow of tasks through the command 504 (creating a new file/document). Diagram 500C shows the cloud storage UI changing to a word processing application UI 532 with a blank word-processing document 536 and associated commands/menus 534 upon receiving user confirmation on the suggested flow of tasks. When the user is finished creating the word processing document 536 (or any other type of file), the document may be saved within the cloud storage service, where the flow of tasks began.

Embodiments are not limited to coaching UI elements being displayed in conjunction with particular commands on a service UI. Diagram 500D shows other examples uses of a coaching UI element. For example, the coaching UI element 542 may be displayed in conjunction with any command or menu item to start a flow of tasks associated with that particular command or menu item. The coaching UI element 544 is an example of presenting a coaching UI element in conjunction with a view of the hosted service UI (e.g., Photos) to represent a flow of tasks that may be performed in association with the view (e.g., sharing the files in the view, printing the files in the view, etc.). Coaching UI element 546 is an example of how a coaching UI element may be used, in conjunction with a displayed item on the hosted service UI. For example, the coaching UI element 546 may represent one or more flows of tasks associated with a file displayed on the cloud storage service UI 502.

A coaching UI element according to embodiments may display one or more flows of tasks at the top level. Each flow of tasks may have multiple levels of tasks that can be defined arbitrarily deep. The explanation or suggestion may be constructed and implemented similarly to the teaching UI element as described herein.

Figure 6:
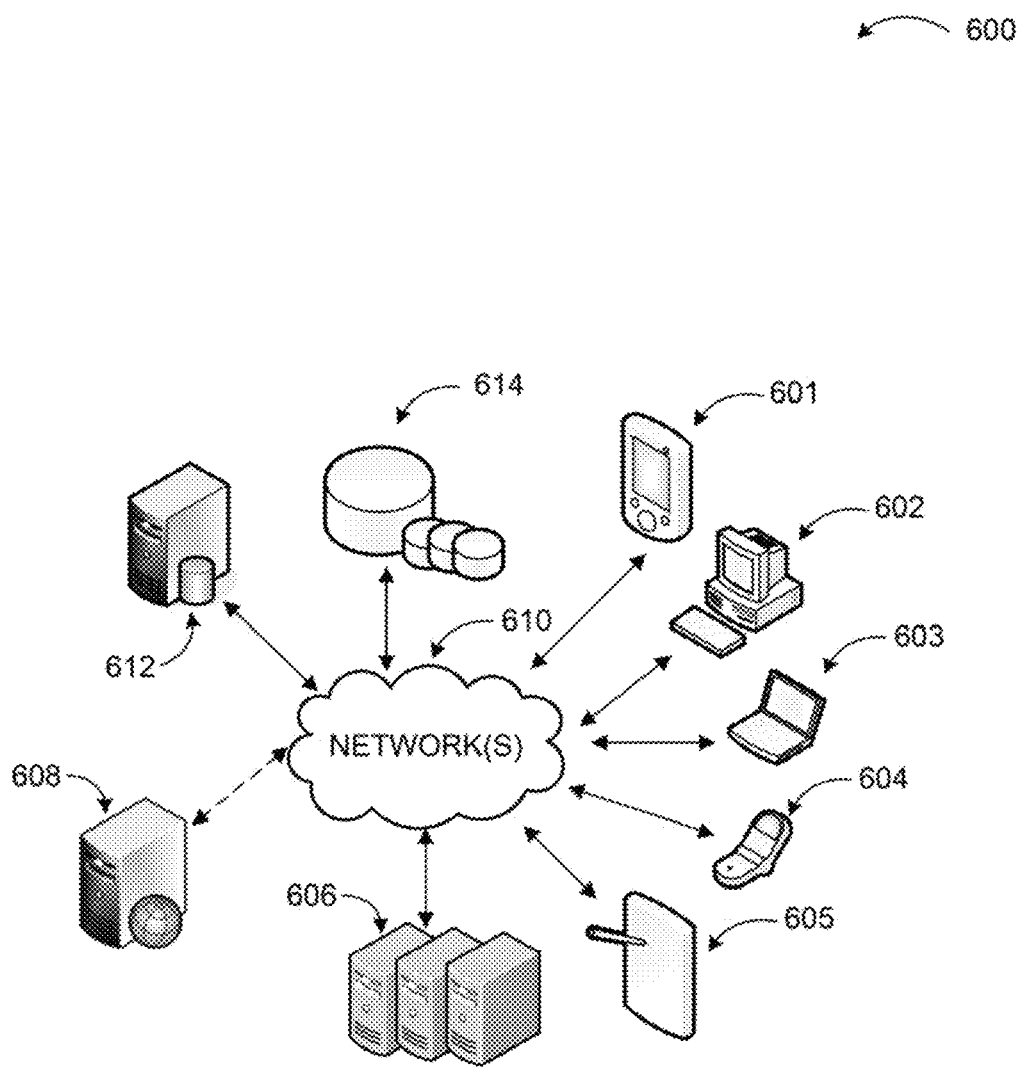
FIG. 6 is a networked environment, where a system according to embodiments may be implemented.

FIG. 6 is a networked environment, where a system according to embodiments may be implemented. A teaching module as described herein may be employed in conjunction with hosted applications and services (for example, the client application 106 associated with the hosted service 116) that may be implemented via software executed over one or more servers 606 or individual server 608, as illustrated in diagram 600. A hosted service or application may communicate with client applications on individual computing devices such as a handheld computer 601, a desktop computer 602, a laptop computer 603, a smart phone. 604, a tablet computer (or slate) 605 ('client devices') through network(s) 610 and control a user interface, such as a dashboard, presented to users.

Client devices 601-605 are used to access the functionality provided by the hosted service or client application. One or more of the servers 606 or server 608 may be used to provide a variety of services as discussed above. Relevant data may be stored in one or more data stores (e.g. data store 614), which may be managed by any one of the servers 606 or by database server 612.

Network(s) 610 may comprise any topology of servers, clients. Internet service providers, and communication media. A system according to embodiments may have a static or dynamic topology. Network(s) 610 may include a secure network such as an enterprise network, an unsecure network such as a wireless open network, or the Internet. Network(s) 610 may also coordinate communication over other networks such as PSTN or cellular networks. Network(s) 610 provides communication between the nodes described herein. By way of example, and not limitation, network(s) 610 may include wireless media such as acoustic, RF, infrared and other wireless media.

Many other configurations of computing devices, applications, engines, data sources, and data distribution systems may be employed to provide a teaching UI element with a celebratory message related to an action performed by the hosted service. Furthermore, the networked environments discussed in FIG. 6 are for illustration purposes only. Embodiments are not limited to the example applications, engines, or processes.

Figure 7:
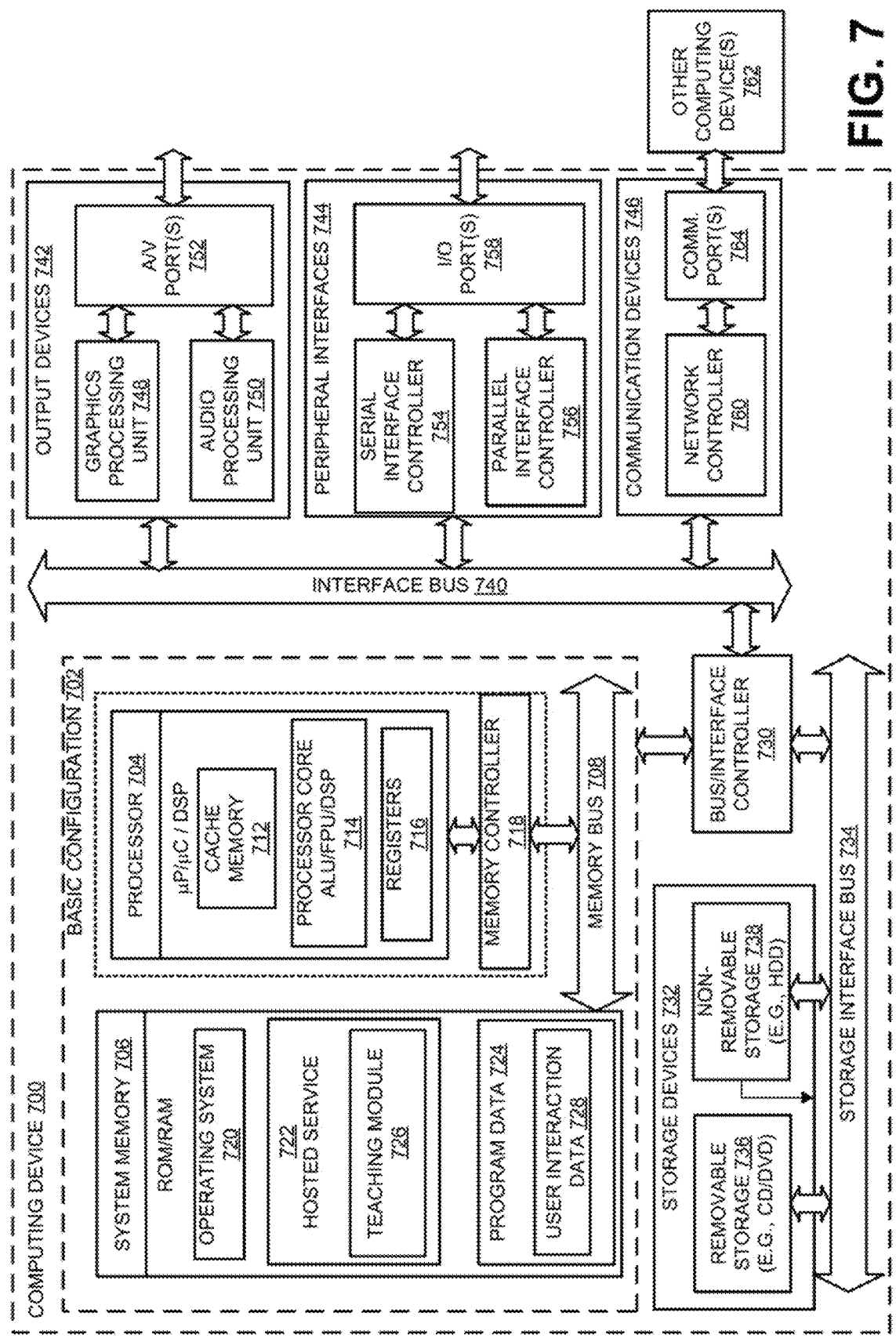
FIG. 7 illustrates a computing device, which may be configured to provide a teaching UI element with a celebratory message related to an action performed by a hosted service.

FIG. 7 illustrates a computing device, which may be configured to provide a teaching element with a celebratory message related to an action performed by a hosted service, arranged in accordance with at least some embodiments described herein.

For example, a computing device 700 may be a server used to provide a teaching UI element with a celebratory message within a hosted service such as a hosted service 722, as discussed herein. In an example of a basic configuration 702, the computing device 700 may include a processor 704 and a system memory 706. The processor 704 may include multiple processors. A memory bus 708 may be used for communication between the processor 704 and the system memory 706. The basic configuration 702 may be illustrated in FIG. 7 by those components within the inner dashed line.

Depending on the desired configuration, the processor 704 may be of any type, including, but not limited to, a microprocessor (μP), a microcontroller (μC), a digital signal processor (DSP), or any combination thereof. The processor 704 may include one more levels of caching, such as a level cache memory 712, a processor care 714, and registers 716. The processor core 714 may include an arithmetic logic unit (ALU), a floating point unit (FPU), a digital signal processing core (DSP Core), or any combination thereof. A memory controller 718 may also be used with the processor 704, or in some implementations, the memory controller 718 may be an internal part of the processor 704.

Depending on the desired configuration, the system memory 706 may be of any type including but not limited to volatile memory (such as RAM), non-volatile memory (such as ROM, flash memory, etc.), or any combination thereof. The system memory 706 may include an operating system 720, the hosted service 722, and program data 724. The hosted service 722 may include a teaching module 726. The teaching module 726 may initiate operations by providing for display an initial configuration of a UI for the hosted service that includes at least one element to highlight a functionality, receiving an initial action from a user associated with the functionality, and performing the initial action. The teaching module 726 may then be configured to update the lit to reflect the performed initial action and provide for display a teaching UI element with a celebratory message to highlight the performed initial action and to provide additional information. Program data 724 may include, among others, user interaction data 728.

The computing, device 700 may have additional features or functionality, and additional interfaces to facilitate communications between the basic configuration 702 and any desired devices and interfaces. For example, a bus/interface controller 730 may be used to facilitate communications between the basic configuration 702 and data storage devices 732 via a storage interface bus 734. The data storage devices 732 may be removable storage devices 736, non-removable storage devices 738, or a combination thereof. Examples of the removable storage and the non-removable storage devices may include magnetic disk devices, such as flexible disk drives and hard-disk drives (HDD), optical disk drives such as compact disk (CD) drives or digital versatile disk (DVD) drives, solid state drives (SSD), and tape drives, to name a few. Example computer storage media may include volatile and nonvolatile, removable, and non-removable media implemented in any method or technology for storage of information, such as computer-readable instructions, data structures, program modules, or other data.

The system memory 706, the removable storage devices 736, and the non-removable storage devices 738 may be examples of computer storage media. Computer storage media may include, but may not be limited to, RAM, ROM, EEPROM, flash memory or other memory; technology, CD-ROM, digital versatile disks (DVD), solid state drives, or other optical storage, magnetic cassettes, magnetic tape, magnetic disk storage or other magnetic storage devices, or any other medium which may be used to store the desired information and which may be accessed by the computing device 700. Any such computer storage media may be part of the computing device 700.

The computing device 700 may also include an interface bus 740 for facilitating communication from various interface devices (for example, one or more output devices 742, one or more peripheral interfaces 744, and one or more communication devices 746) to the basic configuration 702 via the bus/interface controller 730. The one or more output devices 742 may include a graphics processing unit 748 and an audio processing unit 750, which may be configured to communicate to various external devices, such as a display or speakers via one or more A/V ports 752. The one or more peripheral interfaces 744 may include a serial interface, controller 754 or a parallel interface controller 756, which may be configured to communicate with external devices, such as input devices (for example, keyboard, mouse, pen, voice input device, touch input device, etc.) or other peripheral devices (for example, printer, scanner, etc.) via one or more I/O ports 758. The one or more communication devices 746 may include a network controller 760, which may be arranged to facilitate communications with one or more other computing devices 762 over a network communication link via one or more communication ports 764. The one or more other computing devices 762 may include servers, client equipment, and comparable devices.

The network communication link may be one example of a communication media. Communication media may be embodied by computer-readable instructions, data structures, program modules, or other data in a modulated data signal, such as a carrier wave or other transport mechanism, and may include any information delivery media. A "modulated data signal" may be a signal that has one or more of the modulated data signal characteristics set or changed in such a manner as to encode information in the signal. By way of example, and not limitation, communication media may include wired media such as a wired network or direct-wired connection, and wireless media such as acoustic, radio frequency (RF), microwave, infrared (IR), and other wireless media. The term computer-readable media, as used herein, may include both storage media and communication media.

The computing device 700 may be implemented as a part of a general purpose or specialized server, mainframe, or similar computer, which includes any of the above functions. The computing device 700 may also be implemented as a personal computer including both laptop computer and non-laptop computer configurations.

Example embodiments may also include methods to provide a teaching UI element with a celebratory message related to an action performed by a hosted service. These methods may be implemented in any number of ways, including the structures described herein. One such way may be by machine operations, using devices of the type described in the present disclosure. Another optional way may be for one or more of the individual operations of the methods to be performed in conjunction with one or more human operators performing some of the operations while other operations may be performed by machines. These human operators need not be co-located with each other, but each may be with a machine that performs a portion of the program. In other examples, the human interaction may be automated such as by pre-selected criteria that may be machine automated.

Figure 8:
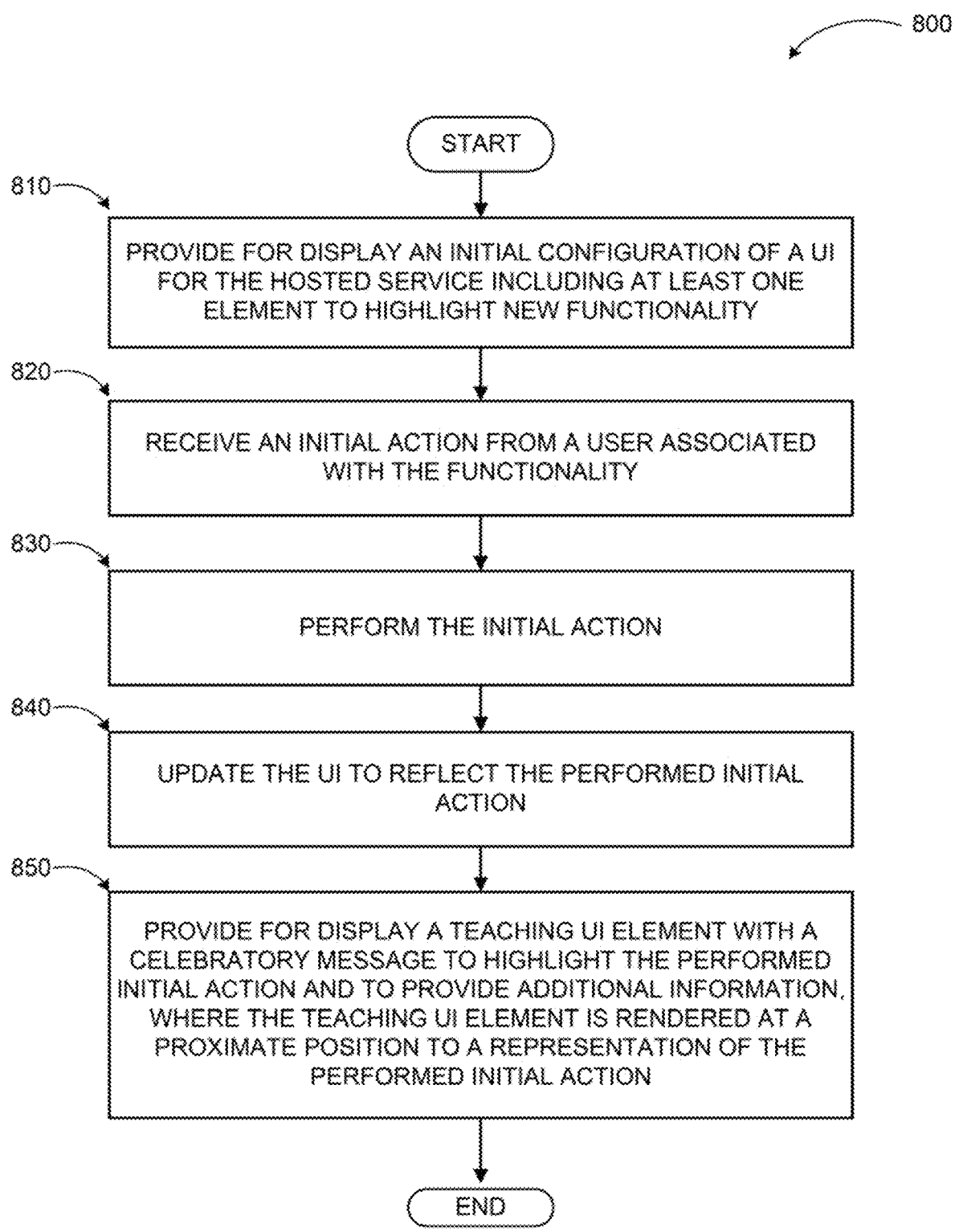
FIG. 8 illustrates a logic flow diagram for an example process to provide a teaching UI element with a celebratory message related to an action performed by a hosted service.

FIG. 8 illustrates a logic flow diagram for an example process to provide a teaching UI element with a celebratory message related to an action performed by a hosted service. Process 800 may be implemented on a computing device, server, or other system. An example server may comprise a communication interface to facilitate communication between one or more client devices and the server, where, the server is configured to host a hosted service. The hosted service may be a productivity service, a collaboration service, and/or a storage service, among other similar services. The example server may also comprise a memory to store instructions, and one or more processors coupled to the memory. The processors, in conjunction with the instructions stored on the memory, may be configured to execute actions for providing a teaching module of the hosted service to provide the teaching UI element with the celebratory message.

Process 800 begins with operation 810, where the teaching module may be configured to provide for display an initial configuration of a UI for the hosted service that includes at least one element to highlight a functionality. In some examples, the element may include a default message generated based on a predicted initial action. The predicted initial action may be obtained by processing a behavioral context of one or more previous actions of the user, a current status of the user, and/or presence information associated with the user with a machine learning scheme. Additionally or alternatively, if user confusion is detected from an analysis of a past action of the user, an instruction may also be included within the default message to resolve the user confusion.

At operations 820 through 840, the teaching module may be configured to receive an initial action from a user associated with the functionality, perform the initial action, and update the UI to reflect the performed initial action, respectively. The hosted service may be a cloud storage service, a productivity service, a collaboration service, a communication service, and/or a calendaring service, among other similar services. In a cloud storage service, for example, the functionality may be an upload functionality and the initial action may be an upload action. In a productivity service, for example, the functionality may be an activation functionality and the initial action may be an activation action.

At operation 850, the teaching module may be configured to provide for display a teaching UI element with a celebratory message to highlight the performed initial action and to provide additional information. The teaching UI element may be rendered at a proximate position to a representation of the performed initial action, where the representation may be a thumbnail or icon representing content associated with the performed initial action. The celebratory message may include a textual, a graphic, an animated, and/or an interactive UI based message. The celebratory message may include an encouraging message and the additional information may be an instructive message, along with actionable items, in relation to the performed initial action. In some embodiments, the additional information may include a suggestion to perform a subsequent action, along with an incentive component to complete the subsequent action. The subsequent action may be predicted based on the content associated with the initial action and contextual information associated with the user.

The operations included in process 800 are for illustration purposes. A teaching UI element with a celebratory message related to an action performed by the hosted service may be provided by similar processes with fewer or additional steps, as well as in different order of operations using the principles described herein. The operations described herein may be executed by one or more processors operated on one or more computing devices, one or more processor cores, specialized processing devices, and/or general purpose processors, among other examples.

Figure 9:
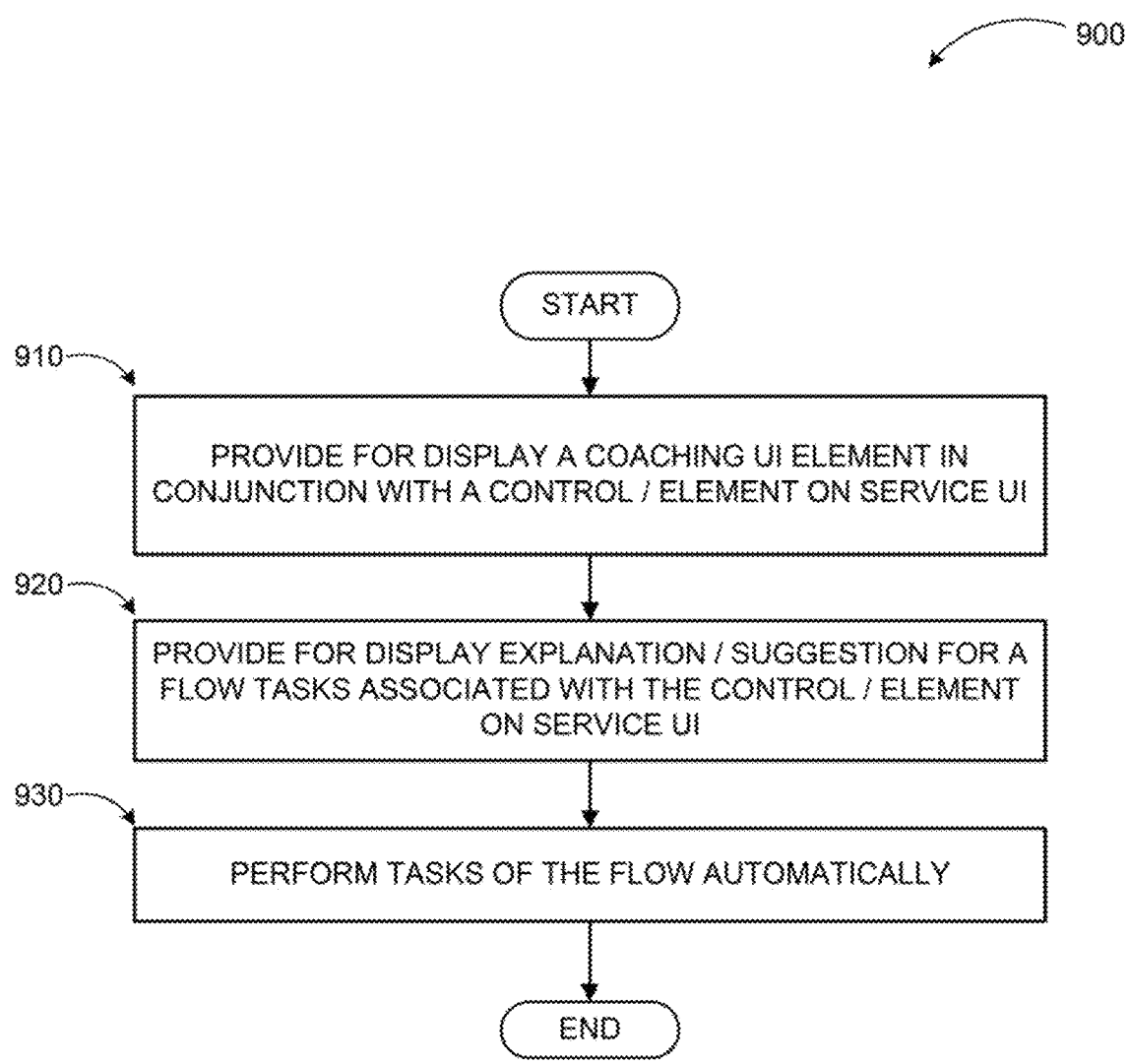
FIG. 9 illustrates a logic flow diagram for an example process to provide a coaching UI element to perform a flow of tasks in a cloud storage service, arranged in accordance with at least some embodiments described herein.

FIG. 9 illustrates a logic flow diagram for an example process to provide a coaching UI element to perform a flow of tasks in conjunction with a hosted service. Process 900 may be implemented on a computing device, server, or other system. An example server may comprise a communication interface to facilitate communication between one or more client devices and the server, where the server is configured to host a cloud storage and/or a productivity service. The example server may also comprise a memory to store instructions, and one or more processors coupled to the memory. The processors, in conjunction with the instructions stored on the memory, may be configured to execute actions for providing a coaching UI element to perform a flow of tasks in conjunction with a hosted service.

Process 900 begins with operation 910, where a coaching UI element may be displayed near (e.g., adjacent to) a control element or an item on a hosted service UI. The hosted, service UI may be a cloud storage service UI, a productivity service UI, a collaboration service UI, and similar ones. The control element may be a command or similar menu item, for example. The other item may be a file or folder displayed through the hosted service UI. The coaching UI element may be displayed upon detection of user interest in the control element or the item. The user interest may be detected as the user clicking on the control element or item, or the user hovering over the control element or item.

Upon detection of user selection of the coaching UI element (e.g., clicking on or hovering over), an explanation or suggestion may be displayed at operation 920 replacing the coaching UI element or in addition to it. The explanation or suggestion nay be associated with a flow of tasks associated with the control element or displayed item. At operation 930, the tasks of the flow of tasks may be performed through the hosted service upon user confirmation.

At operations 920 through 940, the teaching module may be configured to receive an upload action from a user associated with the upload functionality, perform the upload action, and update the UI to reflect the performed upload action, respectively. For example, a modified version of the element may be provided for display to indicate that the upload action has been performed.

The operations included in process 900 are for illustration purposes. A coaching UI element associated with a flow of tasks may be provided by similar processes with fewer or additional steps, as well as in different order of operations using the principles described herein. The operations described herein may be executed by one or more processors operated on one or more computing devices, one or more processor cores, specialized processing devices, and/or general purpose processors, among other examples.

According to examples, a means for providing a teaching user interface element with a celebratory message related to an action performed by a storage service is described. The means may include a means for providing for display an initial configuration of a user interface for the storage service including at least one element to highlight an upload functionality; a means for receiving an upload action from a user associated with the upload functionality; a means for performing the upload action; a means for updating the user interface to reflect the performed upload action; and a means for providing for display a teaching user interface element with a celebratory message to highlight the performed upload action and to provide additional information, where the teaching user interface element is rendered at a proximate position to a representation of the performed upload action.

According to some examples, a method to provide a teaching user interface element with a celebratory message related to an action performed by a storage service is described. The method may include providing for display an initial configuration of a user interface for the storage service including at least one element to highlight an upload functionality; receiving an upload action from a user associated with the upload functionality; performing the upload action; updating the user interface to reflect the performed upload action; providing for display a teaching user interface element with a celebratory message to highlight the performed upload action and to provide additional information, where the teaching user interface element is rendered at a proximate position to a representation of the performed upload action.

According to other examples, the method may also include generating a default message associated with the at least one element to highlight the upload functionality, where the default message includes a suggestion to upload content. The method may further include detecting a user confusion from an analysis of a previous upload action received from the user; and including an instruction in the default message to resolve the user confusion. The instruction may include one or more steps illustrating how to upload content through the user interface. The method may also include generating the celebratory message with an incentive component for the performed upload action.

According to further examples, the method may include predicting a subsequent action of the user based on content uploaded by the upload action and a contextual information associated with the user. The additional information may include a suggestion within the teaching user interface element that prompts the user to perform the subsequent action. The subsequent action may include one or more of a view action, an edit action, and another unload action associated with the uploaded content. The method may also include generating the celebratory message with an incentive component for a completion of the subsequent action. The method may further include providing for display a modified version of the at least one element in conjunction with the teaching user interface element with the celebratory message to highlight the performed upload action.

According to other examples, a server configured to provide a teaching user interface element with a celebratory message related to an action performed by a storage service is described. The server may include a communication interface configured to facilitate communication between a client device and the server, wherein the server is configured to host the storage service; a memory configured to store instructions; one or more processors coupled to the memory, where the one or more processors, in conjunction with the instructions stored in the memory, execute teaching module of the storage service. The teaching module may be configured to provide for display an initial configuration of a user interface for the storage service including at least one element to highlight an upload functionality; receive an upload action from a user associated with the upload functionality; perform the upload action; update the user interface to reflect the performed upload action; and provide for display a teaching user interface element with a celebratory message to highlight the performed upload action and to provide additional information, where the teaching user interface element is rendered at a proximate position to a representation of the performed upload action.

According to some examples, the celebratory message may include one or more of a textual, a graphic, an animated, and an interactive UI based message. The teaching module may be further configured to determine a position for the representation of the performed upload action based on an available space between representations of previously uploaded content and an outer perimeter of the user interface. The teaching module may be an integral module of the storage service or an integral module of a client application locally installed on the client device.

According to further examples, a method to provide a teaching user interface element with a celebratory message related to an action performed by a hosted service is described. The method may include providing for display an initial configuration of a user interface for the hosted service including at least one element to highlight functionality; receiving an initial action from a user associated with the functionality; performing the initial action; updating the user interface to reflect the performed initial action; and providing for display a teaching UI element with a celebratory message to highlight the performed initial action and to provide additional information, where the teaching UI element is rendered at a proximate position to a representation of the performed initial action.

According to yet other examples, the method may also include generating a default message associated with the at least one element to highlight the functionality, where the default message is generated based on a predicted initial action of the user. The method may further include determining the predicted initial action of the user by processing one or more of a behavioral context of previous actions of the user, a current status of the user, and a presence information associated with the user with a machine learning scheme. If the hosted service is a productivity service, the default message may include a suggestion to activate an application associated with the productivity service and the initial action is activation of the application. If the hosted service is a storage service, the default message may include a suggestion to upload content and the initial action is an upload action. The hosted service may include a storage service, a productivity service, a collaboration service, a communication service, or a calendaring service.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments

What is claimed is:

1. A method to provide a teaching user interface element with a celebratory message related to an action performed by a storage service, the method comprising:
    providing for display an initial configuration of a user interface for the storage service including at least one element to highlight an upload functionality;
    receiving an upload action from a user associated with the upload functionality;
    performing the upload action;
    updating the user interface to reflect the performed upload action;
    providing for display a teaching user interface element with a celebratory message to highlight the performed upload action and to provide additional information, wherein the celebratory message comprises an incentive element providing an award for the performed upload action, and wherein the teaching user interface element is rendered at a proximate position to a representation of the performed upload action; and
    predicting a subsequent action of the user based on content uploaded by the upload action and a contextual information associated with the user.

2. The method of claim 1, further comprising:
    generating a default message associated with the at least one element to highlight the upload functionality, wherein the default message includes a suggestion to upload content.

3. The method of claim 2, further comprising:
    detecting a user confusion from an analysis of a previous upload action received from the user; and
    including an instruction in the default message to resolve the user confusion.

4. The method of claim 3, wherein the instruction includes one or more steps illustrating how to upload content through the user interface.

5. The method of claim 1, wherein the additional information includes a suggestion within the teaching user interface element that prompts the user to perform the subsequent action.

6. The method of claim 1, wherein the subsequent action includes one or more of a view action, an edit action, and another upload action associated with the uploaded content.

7. The method of claim 1, wherein the subsequent action includes one or more of a view action, an edit action, and another upload action associated with the uploaded content.

8. The method of claim 1, further comprising:
    providing for display a modified version of the at least one element in conjunction with the teaching user interface element with the celebratory message to highlight the performed upload action.

9. A server configured to provide a teaching user interface element with a celebratory message related to an action performed by a storage service, the server comprising;
    a communication interface configured to facilitate communication between a client device and the server, wherein the server is configured to host the storage service;
    a memory configured to store instructions;
    one or more processors coupled to the memory, wherein the one or more processors, in conjunction with the instructions stored in the memory, execute teaching module of the storage service, the teaching module configured to:
        provide for display an initial configuration of a user interface for the storage service including at least one element to highlight an upload functionality;
        receive an upload action from a user associated with the upload functionality;
        perform the upload action;
        update the user interface to reflect the performed upload action;
        provide for display a teaching user interface element with a celebratory message to highlight the performed upload action and to provide additional information, wherein the celebratory message comprises an incentive element providing an award for the performed upload action, and wherein the teaching user interface element is rendered at a proximate position to a representation of the performed upload action; and
        predicting a subsequent action of the user based on content uploaded by the upload action and a contextual information associated with the user.

10. The server of claim 9, wherein the celebratory message includes one or more of a textual, a graphic, an animated, and an interactive UI based message.

11. The server of claim 9, wherein the teaching module is further configured to:
    determine a position for the representation of the performed upload action based on an available space between representations of previously uploaded content and an outer perimeter of the user interface.

12. The server of claim 9, wherein the teaching module is one of an integral module of the storage service and an integral module of a client application locally installed on the client device.

13. A method to provide a teaching user interface element with a celebratory message related to an action performed by a hosted service, the method comprising:
    providing for display an initial configuration of a user interface for the hosted service including at least one element to highlight functionality;
    receiving an initial action from a user associated with the functionality;
    performing the initial action;
    updating the user interface to reflect the performed initial action;
    providing for display a teaching UI element with a celebratory message to highlight the performed initial action and to provide additional information, wherein the celebratory message comprises an incentive element providing an award for the performed upload action and wherein the teaching UI element is rendered at a proximate position to a representation of the performed initial action; and
    predicting a subsequent action of the user based on content uploaded by the upload action and a contextual information associated with the user.

14. The method of claim 13, further comprising;
    generating a default message associated with the at least one element to highlight the functionality, wherein the default message is generated based on a predicted initial action of the user.

15. The method of claim 14, further comprising:
    determining the predicted initial action of the user by processing one or more of a behavioral context of previous actions of the user, a current status of the user, and a presence information associated with the user with a machine learning scheme.

16. The method of claim 15, wherein, the hosted service is a productivity service, and the default message includes a suggestion to activate an application associated with the productivity service and the initial action is activation of the application.

17. The method of claim 15, wherein, the hosted service is a storage service, the default message includes a suggestion to upload content and the initial action is an upload action.

18. The method of claim 15, wherein the hosted service is one of a storage service, a productivity service, a collaboration service, a communication service, and a calendaring service.

* * * * *